(No Model.)
C. H. RICHARDSON.
STEERING APPARATUS.
No. 471,570. Patented Mar. 29, 1892.
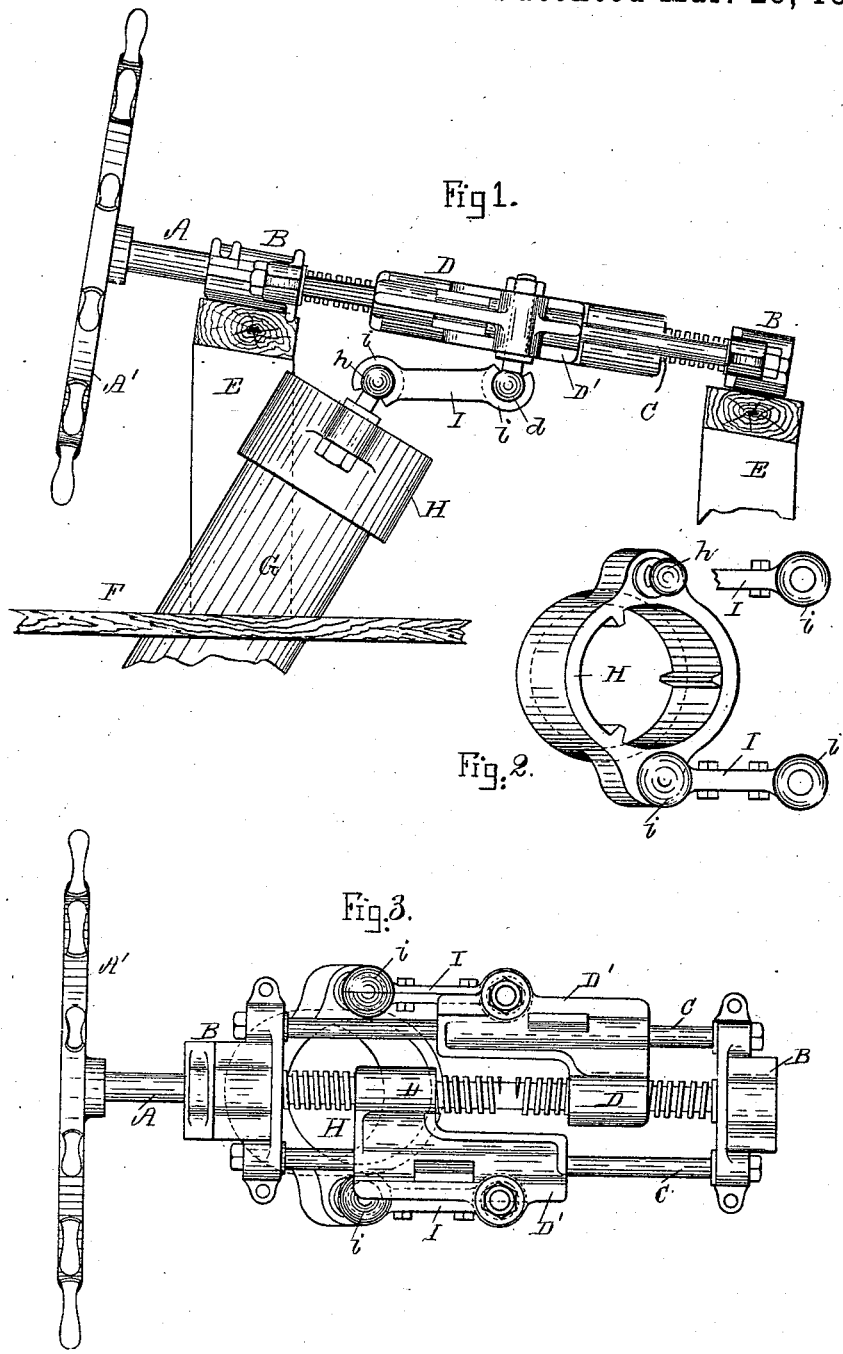
Witnesses.
Alice A. Perkins
Geo. W. White
Inventor.
Charles H. Richardson
by Alban Andrén, his atty

UNITED STATES PATENT OFFICE.

CHARLES H. RICHARDSON, OF GLOUCESTER, MASSACHUSETTS.

STEERING APPARATUS.

SPECIFICATION forming part of Letters Patent No. 471,570, dated March 29, 1892.

Application filed January 28, 1892. Serial No. 419,559. (No model.)

*To all whom it may concern:*

Be it known that I, CHARLES H. RICHARDSON, a citizen of the United States, and a resident of Gloucester, in the county of Essex and State of Massachusetts, have invented new and useful Improvements in Steering Apparatus, of which the following, taken in connection with the accompanying drawings, is a specification.

This invention relates to improvements on the steering apparatus granted to Nathan Richardson May 30, 1882, No. 258,809; and it has for its object to enable the rudder-post to be arranged at any desired angle relative to the screw-threaded wheel-shaft, as will hereinafter be more fully shown and described, reference being had to the accompanying drawings, wherein—

Figure 1 represents a side elevation of the improved steering apparatus. Fig. 2 represents a detail plan view of the rudder-head and its ball-and-socket links, and Fig. 3 represents a plan view of the improved steering apparatus.

Similar letters refer to similar parts wherever they occur on the different parts of the drawings.

In the drawings, A is the right and left screw-shaft, journaled in bearings B B, which are connected together by means of guide-rods C C, upon which the L-shaped arms D' D' of the nuts D D are guided in a manner as fully shown and described in the aforesaid patent.

A' is the wheel secured to the front end of the screw-shaft A, as usual.

E E represent the frame-work or standards secured to the deck F of the vessel, as usual, said standards serving as supports for the bearings B B, as shown.

G represents the rudder-post, which may be arranged at any desired angle relative to the shaft A, as shown in Fig. 1. To the rudder-post G is secured the head H, having attached to it the diametrically-opposed upwardly-projecting balls *h h*, as shown. *d d* are corresponding balls secured to the under side of the respective L-shaped arms D' D', and I I are links by which each pair of balls *d h d h* are connected, such links having for this purpose sockets *i i*, adapted to receive said balls, as shown. Each link I is preferably made in two longitudinal parts for the purpose of readily connecting it to the balls on the sliding arms D' and rudder-head. The component parts of each of said links are secured together preferably by bolts and nuts after being connected to the balls *d* and *h*, as shown.

By connecting the rudder-head G to the sliding arms D' D' by means of balls and socket-links, as above mentioned, the steering-shaft A may be located at any desired angle to the rudder-post with equally good results in the working of the rudder. This is a great advantage over the ordinary steering apparatus, in which it is essential to have the steering-shaft at a right angle to the rudder-post, owing to the construction of the connecting device between the rudder-head and the sliding arms. In such previous steering apparatus the connecting-links between the rudder-head and the sliding arms moved in a plane parallel with the screw-threaded steering-shaft and at a right angle to the axis of the rudder-post, whereas in my device, in which said links are universally connected in their ends to the rudder-head and sliding arms, said links are capable of adjusting themselves automatically to the rise and fall of the ends of the rudder-head when used on a rudder-post, which is more or less inclined to the wheel-shaft, as shown in the drawings.

In many of the yachts and vessels now already built and in process of construction the rudder-post is made raking—that is, arranged at an angle to the water-line—by which it becomes necessary to arrange the wheel-shaft at an angle to the rudder-post, differing from a right angle, and for this purpose my improved construction and arrangement are especially designed.

The improved steering apparatus may also be used where the rudder-post is arranged at a right angle to the wheel-shaft without departing from the essence of my invention.

Having thus fully described the nature, construction, and operation of my invention, I wish to secure by Letters Patent, and claim—

The herein-described steering apparatus, consisting, in combination, of a right and left screw-shaft and nuts working thereon, having arms or guide-blocks adapted to slide on parallel rods or ways, balls secured to said guide-blocks and to the rudder-head, and socketed links connecting the respective balls on the rudder-head and sliding blocks, substantially as and for the purpose set forth.

In testimony whereof I have signed my name to this specification, in the presence of two subscribing witnesses, on this 23d day of January, A. D. 1892.

CHARLES H. RICHARDSON.

Witnesses:
FRED T. DAY,
JOSIAH OBEAR.